Nov. 12, 1957 T. TELSEY 2,812,603
TAPE POSTING CALENDAR
Filed Nov. 24, 1954 2 Sheets-Sheet 1

INVENTOR.
THOMAS TELSEY
BY

ATTORNEY.

Nov. 12, 1957  T. TELSEY  2,812,603
TAPE POSTING CALENDAR
Filed Nov. 24, 1954  2 Sheets-Sheet 2
Fig. 5.
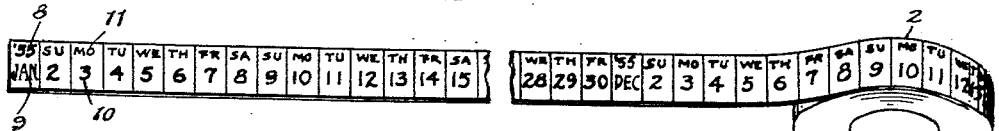
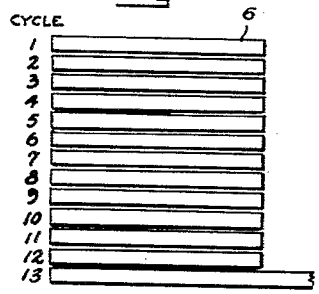
Fig. 6.
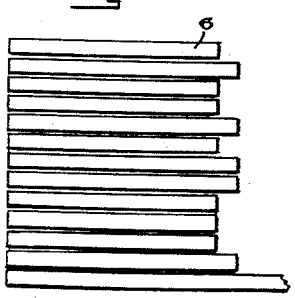
Fig. 7.
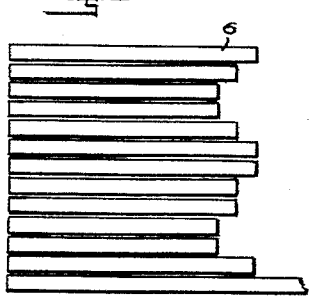
Fig. 8.
Fig. 9.
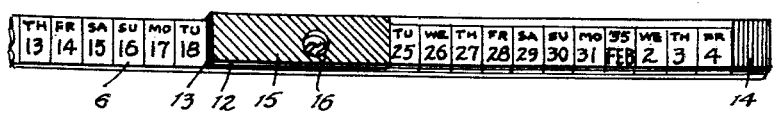
Fig. 10.
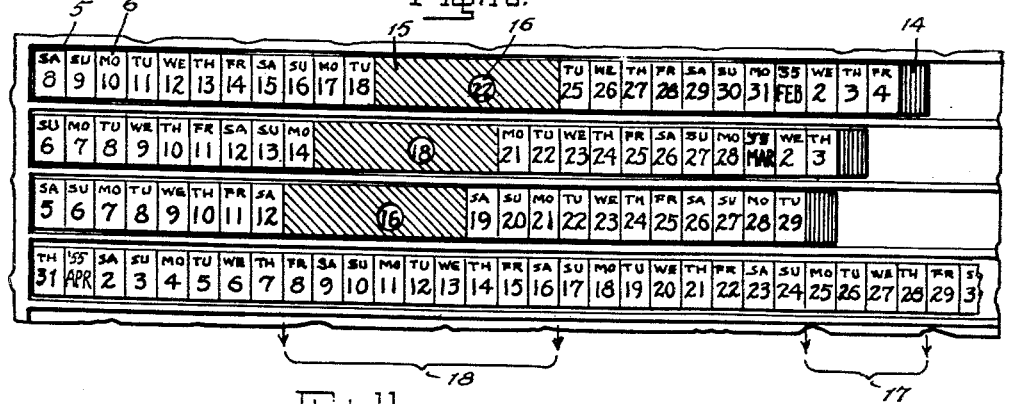
Fig. 11.
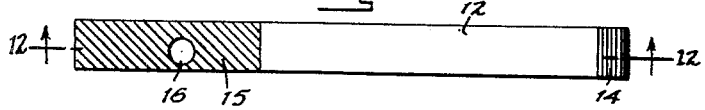
Fig. 12.
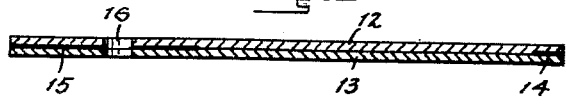
INVENTOR.
THOMAS TELSEY
BY
ATTORNEY.

United States Patent Office 2,812,603
Patented Nov. 12, 1957

2,812,603

TAPE POSTING CALENDAR

Thomas Telsey, Glenwild, N. Y.

Application November 24, 1954, Serial No. 471,010

3 Claims. (Cl. 40—107)

Women have ever reckoned time by the moon; it is understandable, when we consider that the average menstrual cycle is very close to the lunar cycle of twenty-nine and one-half days. The invention is generally concerned with a new method of prognosticating events of a cyclic nature.

The invention is particularly concerned with the "tape posting calendar"; one object of which is to provide every woman, from puberty to menopause with a convenient and personal way of recording menstrual flow.

Another object of the invention is to furnish healthy married couples with the ready means of determining the propitious time for the conception of the "planned baby."

Another object of the invention is to provide married couples with a guide for "natural coitus" where conception is contraindicated.

Still another object of the invention is to make available to agriculture, science and industry an expedient system of posting phenomena and facts of a periodic nature for comparative purposes and/or for predicting the future.

In the accompanying drawings:

Fig. 5 is a plan view of the "date tape."

Fig. 6 is a plan view of posted cycle strips illustrating "a simple cycle pattern."

Fig. 7 is a plan view of posted cycle strips illustrating "a double cycle pattern."

Fig. 8 is a plan view of posted cycle strips illustrating "a triple cycle pattern."

Fig. 9 is a perspective of an individual marker tape superimposed on a posted cycle strip.

Fig. 10 is a plan view of a multiple cycle posting with the "ovulation" marker tapes in place.

Fig. 11 is a plan view of a marker tape.

Fig. 12 is a longitudinal sectional view taken along the line 12—12 of Fig. 11.

Figure 1:
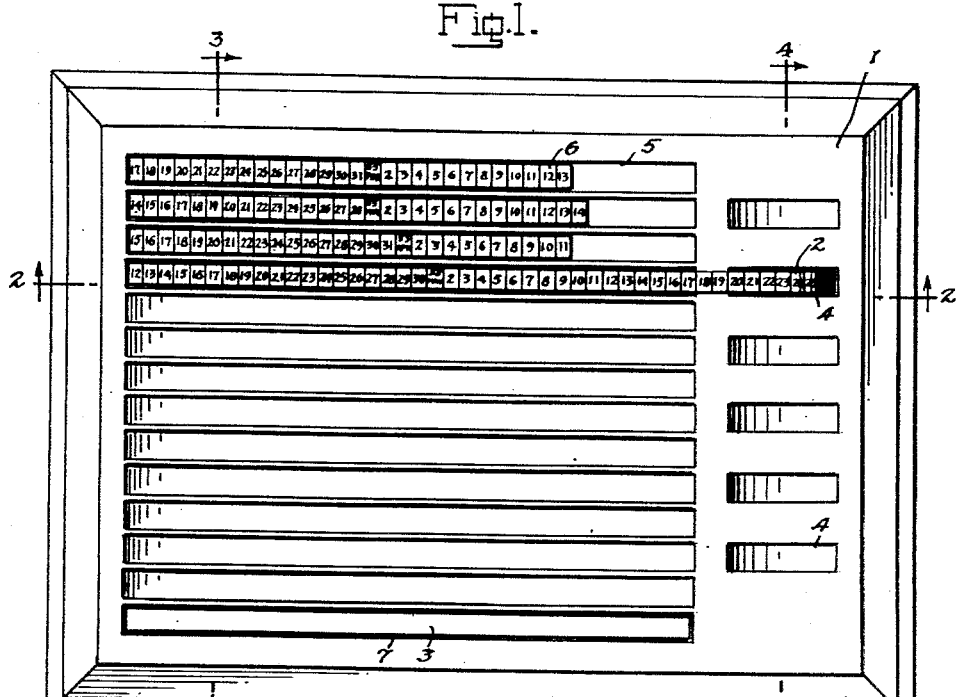
Fig. 1 is a plan view of the "tape posting calendar."
Figure 2:
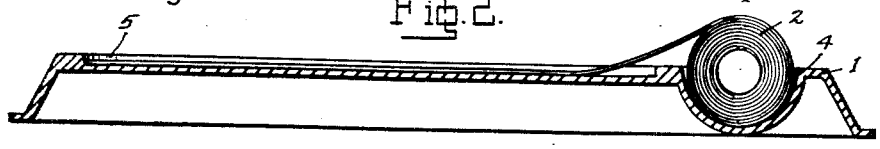
Fig. 2 is a sectional view taken horizontally through the tape posting calendar on line 2—2 of Fig. 1.
Figure 3:
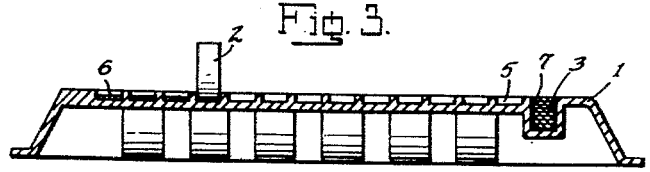
Fig. 3 is a sectional view taken vertically through the tape posting calendar on line 3—3 of Fig. 1.
Figure 4:
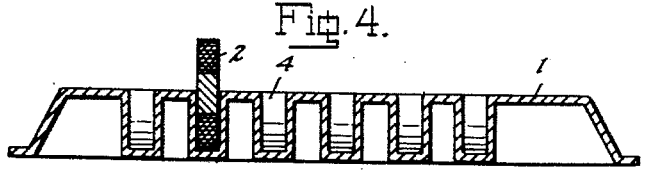
Fig. 4 is a sectional view taken vertically through the tape posting calendar on line 4—4 of Fig. 1.

The "tape posting calendar," Fig. 1, has the following components; "posting" board 1, roll of "date tape" 2, and pack of "marker tapes" 3.

The "posting" board 1 may be made of paper, plastic, wood, metal or a combination of these materials. It has six hollows 4 to hold the "time tape" roll 2 in convenient horizontal positions. It has thirteen shallow horizontal grooves 5 aligned vertically to receive cycle strips 6 as they are successively severed from the time tape roll 2. An additional groove 7 deeper than the others is used to stow the pack of "marker tapes" 3, one being provided for each posting groove.

The "date tape" roll 2 shown in detail Fig. 5 may be manufactured from paper, fabric, plastic or a combination of these materials, coated upon the underside with pressure sensitive adhesive. The "date tape" is printed (or perforated) transversely dividing it into three hundred and sixty-five equal units (one added for leap year). Within each unit, appropriately printed in chronological order, is information such as: the current year 8, the month 9, the date 10, and the day of the week 11.

The pack 3 consists of one dozen "marker tapes," mounted on and folded into a common liner. The physical make-up of the individual "marker tape" together with its functions and justification for use will be subsequently reviewed. The individual "marker tape" may be seen in use in Fig. 9.

The method of operating "the tape posting calendar" as a menstrual record is as follows:

The woman may start at any time by cutting the date tape, precisely, on the line between the first and second days of her "last" menstruation (discarding the initially severed piece).

She then posts the unlined free end of "the date tape" from roll 2, so as to coincide with the extreme left edge in the first groove 5. She presses the slack tape back along the groove, then tucks the roll 2 into the nearest hollow 4 to await the "next" menstruation.

On the "next" menstruation the date tape is cut precisely on the line between the first and second days. This severed piece becomes the first "cycle strip" 6; a "cycle strip" always starts on the second day of the "last" menses and ends on the first day of the "next" menses.

Fig. 6 shows a twelve cycle posting pattern for women with regular periods. Fig. 7 and Fig. 8 show patterns of twelve cycle postings for women with irregular periods. It is fortunate, that more than ninety-five percent of the women fall into the first category; because predictions based on simple cycles are most dependable.

The "ovulation" marker tape is a guide to the fertility and the fecundity intervals in the female cycle. It comprises a strip 12 preferably formed of transparent acetate of a width corresponding to that of the date tape 2 and of a length corresponding to eighteen units of the date tape. The strip 12 is mounted on a tape 13 preferably formed of transparent acetate coated upon its upper and lower sides with pressure sensitive adhesive so that the strip 12 is adhered thereto and the marker tape may be adhered to the tape 2. The strip is painted or stained on the underside, then perforated as at 16 after mounting. The green section 15 painted on the left extremity is six units wide and represents the fertile interval of six days. The perforation 16 is centered at a position in the green section 15 in the area representing the fourth unit from the left. i. e., the green section represents six days and the perforation is positioned with respect to the fourth day. The red section 14 painted on the extreme right is one unit wide and represents the "first" day of menstruation. Fig. 9 indicates the proper posting; the red section 14 must coincide with the last day of the "cycle strip" 6.

The "ovulation" marker tape represents a regularly recurring function in the cycles of all females. It's design was based upon the discovery by Professor Knauss that the ovum is born exactly fifteen days before the next menstruation in every woman. Subsequent study has revealed that a day after the ovum is expelled from the ovary of a woman, a yellow body starts to function at the site.

It is a known fact that the yellow body functions for exactly fourteen days (to prepare the woman for possible motherhood) and at the end of this period if the ovum has not been fertilized, menstruation starts immediately.

It will be noted that the perforation or window through which the ovulation day will be viewed is exactly fifteen days removed from the next menstrual flow. Strictly speaking, the extent of the fertile interval is only three days; the maximum life of a male sperm within the female, awaiting the birth of her ovum is at most forty-eight hours, while the maximum life span of the ovum is twenty-four hours. A three day margin has been added to compensate for human error in reckoning bringing the fertile period (green) up to six days.

In operating the "tape posting calendar" as a fertility and a fecundity guide, it becomes obvious that when super-imposing the marker tapes upon past cycles of regular menstruation that prediction presents no problems. Fig. 10 is an example of irregularity, a triple cycle of 26, 27, and 29 days will cause a "probability spread" in menstrual expectancy 17, of four days and will "prolong" the probable fertile period 18 three days. The result will be a decrease in the number of days for safe natural coitus.

I conclude by making the following claims which I regard as my invention:

1. A tape posting calendar, comprising a roll of pressure sensitive posting tape having pressure sensitive adhesive at its under side normally retaining the convolutions of said roll against unwinding through adherence to the upper side of adjacent convolutions, and whereby unwound sections of said tape are adapted to be adhered to an adhesive receptive surface, its upper side being divided into a plurality of successive equal length units respectively containing in chronological order calendar day indicia representing in total time a plurality of successively occurring cyclical events, sections of said tape being unwindable from said roll and successively transversely severable along selected division lines between said units, whereby the terminal unit of each section bears the calendar day indicia directly preceding the calendar day indicia of the starting unit of the succeeding section, and a posting board for adherence of said tape in a succession of severed sections, each comprising a plurality of said units representing an indeterminate period of days between cyclical events of indeterminate occurrence within a calculated maximum range of days, said posting board having a series of equal length equal width horizontal flat tape-securing adhesive receptive surfaces in parallel contiguous succession with their starting ends in vertical alignment with each other, the width of each said surface being at least equal to the width of said tape, the total length of said series of surfaces being at least equal to the total length of said tape, the number of said surfaces being at least equal to the number of sucsive cyclical events occurring in the total time represented by the total length of said tape, and the length of each said surface being at least equal to the length of a section of tape representing a calculated maximum period of days between successive cyclical events, the starting unit of each said tape section determined by the occurrence of a cyclical event being adhered in line with the starting end of its respective tape-receiving surface whereby the terminal unit of said adhered tape section is spaced from the terminal end of said surface to present an exposed portion of said surface, the exposed portions of a plurality of said surfaces varying in length conversely with the variations in length of said tape sections adhered thereto.

2. The invention as defined in claim 1, further characterized by pocket means carried by said board adjacent the terminal ends of said tape-receiving surfaces for receiving said tape roll connected to an unwound unsevered tape section adhered to one of said surfaces.

3. The invention as defined in claim 1, further characterized by a plurality of equal length marker tapes corresponding in number to the number of said tape-receiving surfaces, each having pressure sensitive adhesive at its under side, and each of a width no greater than the width of said posting tape and of a length to be secured over a portion of each severed tape section with the terminal end of each said marker tape in super-imposed aligned relation with the terminal end of each said tape section, whereby the distance between the starting ends of said marker tapes and the starting ends of said tape sections varies directly with the variations in length of said tape sections.

References Cited in the file of this patent
UNITED STATES PATENTS

| | | |
|---|---|---|
| 485,133 | Palmer | Oct. 25, 1892 |
| 1,385,140 | Martin | July 19, 1921 |
| 1,470,065 | Downer | Oct. 9, 1923 |
| 1,554,467 | Stratton | Sept. 22, 1925 |
| 1,762,753 | Aronson | June 10, 1930 |
| 2,046,239 | Bardrof | June 30, 1936 |
| 2,134,928 | Rahn | Nov. 1, 1938 |
| 2,465,238 | Laux | Mar. 22, 1949 |
| 2,577,544 | Schenk | Dec. 4, 1951 |